US010455237B2

(12) United States Patent
Ghosh et al.

(10) Patent No.: US 10,455,237 B2
(45) Date of Patent: Oct. 22, 2019

(54) DYNAMIC COMPRESSION OF MULTIMEDIA CONTENT BASED ON SOCIAL AND RELATIONAL CONTEXT

(71) Applicant: International Business Machines Corporation, Armonk, NY (US)

(72) Inventors: Rahul Ghosh, Morrisville, NC (US); Hugh E. Hockett, Raleigh, NC (US); Aaron J. Quirk, Cary, NC (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 777 days.

(21) Appl. No.: 14/887,431

(22) Filed: Oct. 20, 2015

(65) Prior Publication Data
US 2017/0111641 A1    Apr. 20, 2017

(51) Int. Cl.
*H04N 19/162* (2014.01)
*H04N 19/136* (2014.01)

(52) U.S. Cl.
CPC ......... *H04N 19/162* (2014.11); *H04N 19/136* (2014.11)

(58) Field of Classification Search
CPC ......... G06F 17/30067; G06F 17/30129; G06F 17/30289; G06F 17/30979; Y10S 707/99932
See application file for complete search history.

(56) References Cited

U.S. PATENT DOCUMENTS

| 8,176,523 | B2 | 5/2012 | Kortum et al. |
| 2012/0131610 | A1 | 5/2012 | Fernandez Gutierrez et al. |
| 2012/0303489 | A1 | 11/2012 | Robb et al. |
| 2013/0085802 | A1* | 4/2013 | Belady ............ G06Q 90/00 705/7.29 |
| 2013/0085804 | A1* | 4/2013 | Leff ............ G06Q 30/0219 705/7.29 |
| 2013/0110775 | A1 | 5/2013 | Forsythe |
| 2014/0095657 | A1 | 4/2014 | McLane et al. |
| 2014/0095789 | A1* | 4/2014 | Chambliss ......... G06F 12/0897 711/117 |

(Continued)

FOREIGN PATENT DOCUMENTS

CN    102428699 A    4/2012

OTHER PUBLICATIONS

Anonymously,"Detection and Reaction to Contextual Information based on analysis of a Live Data Stream", IP Electronic Publication, Jun. 22, 2010, pp. 1-5.

(Continued)

*Primary Examiner* — Clifford Hilaire
(74) *Attorney, Agent, or Firm* — Cantor Colburn LLP; Alexander Jochym

(57) ABSTRACT

In one aspect, a computer-implemented method for compressing content based on a social factor, an environmental factor, and a relational factor is described. The method may include monitoring access to the content, forming, by a processor, a contextual evaluation based on the monitored access and determining an importance of the content based on the contextual evaluation. The method may further include storing the content in a compressed form, where the compressed form is selected based on the importance.

16 Claims, 4 Drawing Sheets

(56) References Cited

U.S. PATENT DOCUMENTS

2014/0195625 A1\* 7/2014 Weldon .................. H04L 51/32
                                                        709/206
2015/0243326 A1\* 8/2015 Pacurariu ............. G11B 27/031
                                                        386/280

OTHER PUBLICATIONS

K.Brown, et al.,"Suitable Development-Integrating Environmental, Social, and Economic Concerns", IPCOM, May 7, 2012, pp. 1-5.
R. Fracchia, et al.,"End-to-end application control of video streaming: implementation and performance evaluation", IEEE, INSPEC, 2011, pp. 1-5.

\* cited by examiner

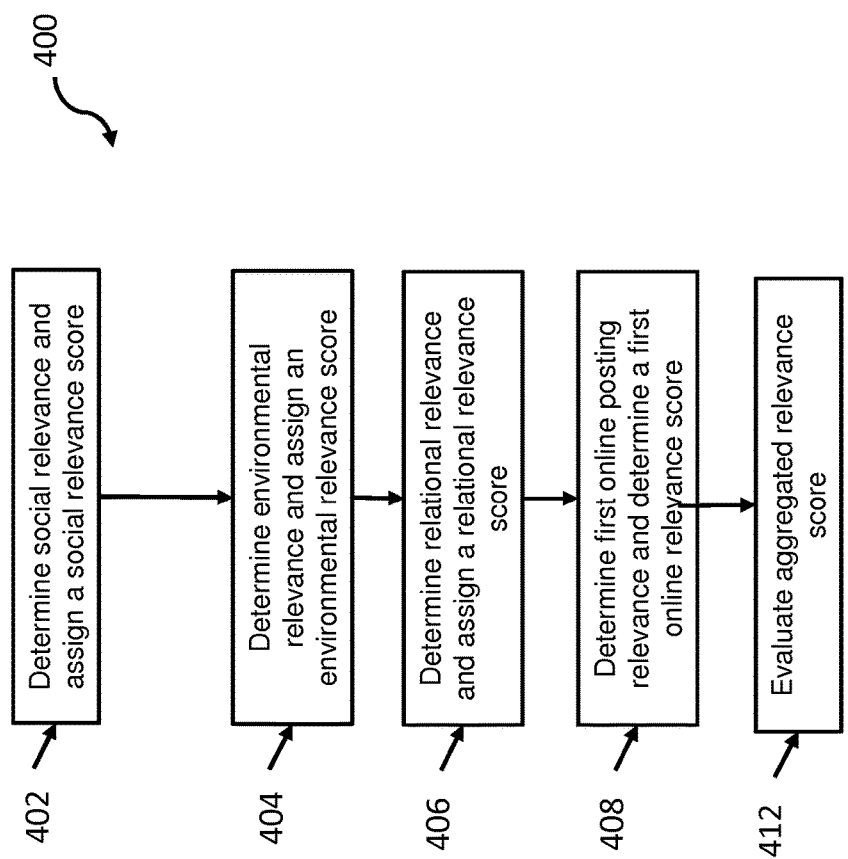

DYNAMIC COMPRESSION OF MULTIMEDIA CONTENT BASED ON SOCIAL AND RELATIONAL CONTEXT

BACKGROUND

The present disclosure relates to dynamic compression of multimedia content, and more specifically, to systems and methods for dynamic compression of multimedia content based on social and relational context.

Multimedia is often recorded at adjustable compression levels that can be configured on the digital recording device. For example, the video quality on a stand-alone digital video camera may be adjustable to Standard Play (SP), Long Play (LP), etc., to change quality and overall file size. Similarly, on a mobile device a configuration may provide for a low, medium or high resolution for multimedia recordings based on the indicated needs of the user. On mobile devices where local storage may be limited, a smaller file size may be desirable. High video compression is a lower quality video but may provide multimedia storage with a smaller file size. Inversely, lower video compression may provide a higher resolution multimedia file, but the file size is larger relative to high compression.

Smaller file size may be desirable when downloading a video for bandwidth optimization. Devices increasingly use cloud computing environments to remotely store digital multimedia. Concerns about bandwidth may be relevant for both mobile device users and the datacenters/content providers that may host collections of video files. Remote file storage often provides for more media storage than may be available on a local flash storage of the mobile device, which provides increasing motivation for users to store data in the cloud (e.g., in a remote multimedia server).

Users often expect that their multimedia content should be available from the cloud server because they may wish to share their own multimedia with other viewers. Some videos may be shared extensively (e.g., the video is often described as "viral"), whereas others may be scarcely shared at all. More popular multimedia data may be most enjoyed by consumers with a high-quality (low compression) state. Less popular video data may be most optimally stored at a low quality (high compression) state, because it has a minimized viewership. However, knowing the ideal compression level in advance (at the time the video is uploaded) may be problematic, because the future popularity of multimedia may be difficult to predict.

SUMMARY

In one aspect, a computer-implemented method for compressing content is described. The method may include monitoring access to the content, forming, by a processor, a contextual evaluation based on the monitored access and determining an importance of the content based on the contextual evaluation. The method may further include storing the content in a compressed form, where the compressed form is selected based on the importance.

In another aspect, a system for compressing content is described. The system may include a processor configured to monitor access to the content, form a contextual evaluation based on the monitored access and determine an importance of the content based on the contextual evaluation, and store the content in a compressed form, where the compressed form is selected based on the importance.

In yet another aspect, a non-transitory computer-readable storage medium is described. The medium may store computer-executable instructions that, when executed, perform a method that may include monitoring access to the content, forming, by a processor, a contextual evaluation based on the monitored access and determining an importance of the content based on the contextual evaluation, and storing the content in a compressed form, where the compressed form is selected based on the importance.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 depicts a flow diagram of a method for determining importance of content in accordance with an exemplary embodiment.

DETAILED DESCRIPTION

Figure 1:
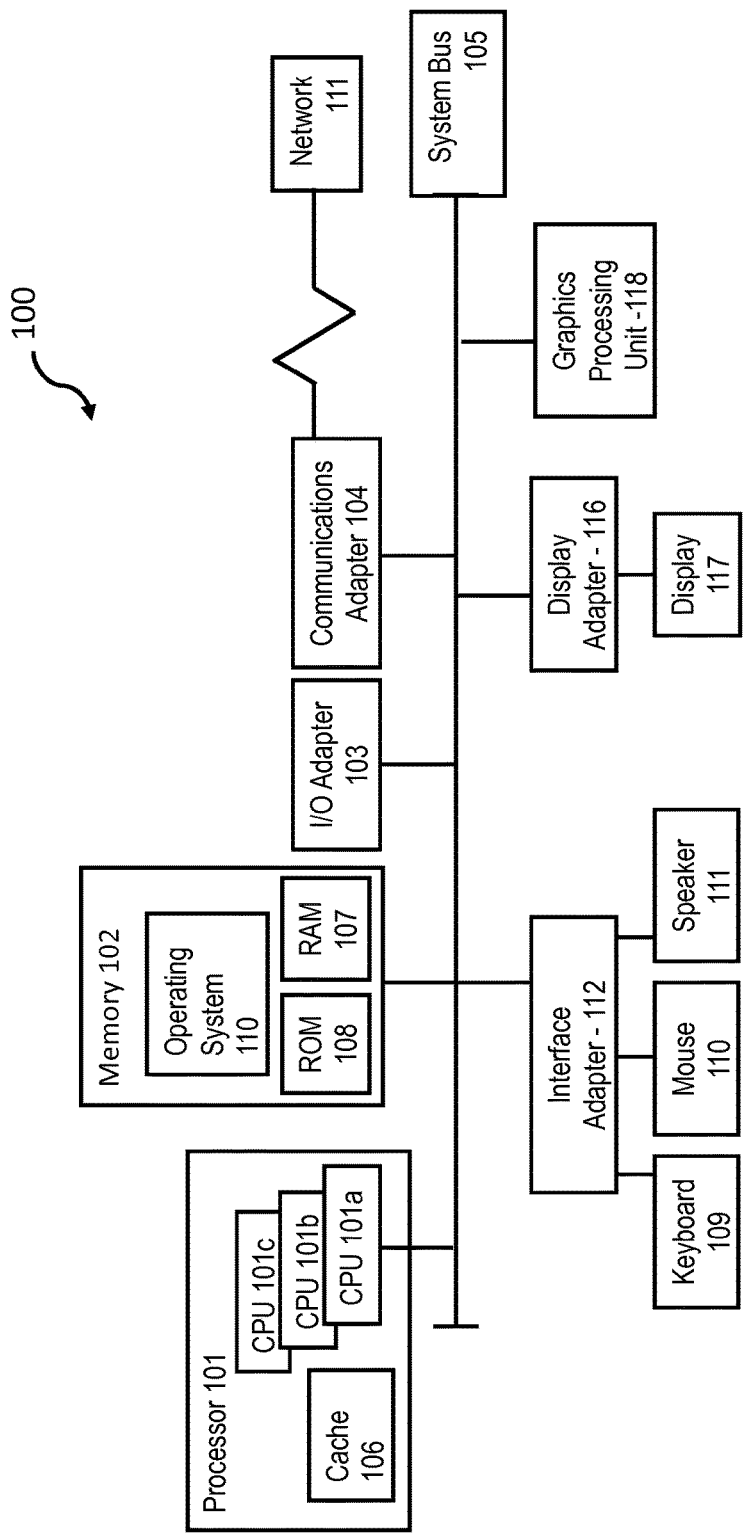
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices 109. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 110, speaker 111, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 101, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 113. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 111 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 113, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
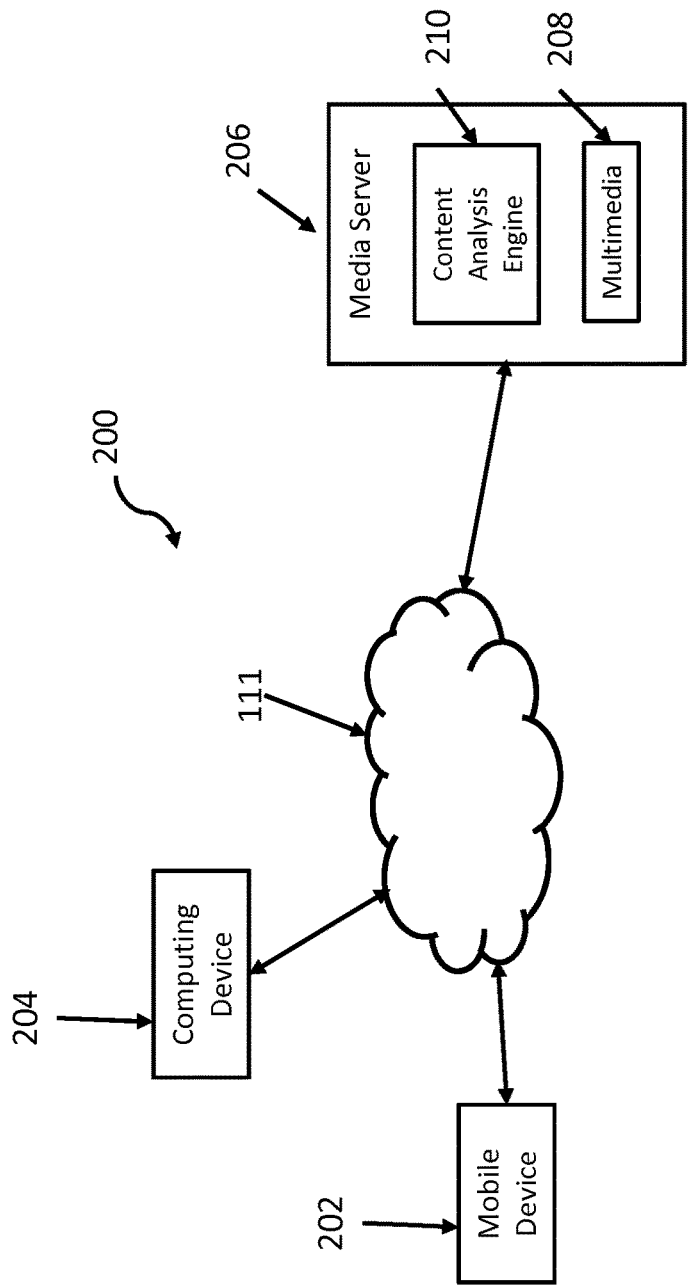
FIG. 2 depicts a computing environment for dynamic compression of multimedia content in accordance with an exemplary embodiment.

With increasing amounts of video data residing in cloud devices (e.g., file servers), it may be advantageous to dynamically optimize the compression level of multimedia data files, which may reduce bandwidth and storage costs associated with the multimedia. Referring now to FIG. 2, an exemplary computing environment 200 for dynamic compression of multimedia content is depicted, in accordance with an exemplary embodiment. In some aspects, computing environment 200 may include one or more mobile devices 202, one or more computing devices 204, and at least one media server 206. In some aspects, devices 202 and 204 may be operatively connected to media server 206 via network 111.

Media server 206 may store one or more multimedia files 208 in an operatively connected computer memory (e.g., RAM 107). Media server 206 may determine importance of multimedia content 208 with a content analysis engine 210.

In some aspects, media server 206 may be operative as a network device for cloud service provider that may host multimedia files for online consumption. As explained with respect to some embodiments, it may be advantageous to reduce the file size of multimedia files (e.g., multimedia 208) stored on media server 206 in order to optimize storage and/or bandwidth costs. For example, a multimedia file stored on media server 206 may store a digital video of a current event (e.g., a political demonstration). If the particular event is deemed important based on associated social media context, then the recording may be saved and/or compressed to reflect a higher quality. For example, if the subject matter of a video is trending (e.g., having an increasing popularity with multimedia consumers), as demonstrated by social media activity (e.g., Tweets™ or Facebook™ posts), the contextual analysis of the tweets may indicate that the video depicts something having an extraordinary interest to video consumers. In other embodiments, if a video recorder takes a digital recording the user walking through the desert and the video is uploaded to media server 206, there may be no related social media activity about that location or event, and thus, the recording may be ideally saved and/or streamed by multimedia consumers at lower quality (having a higher data compression). It may be advantageous to provide systems and methods for dynamic compression of multimedia content based on social and relational context.

Figure 3:
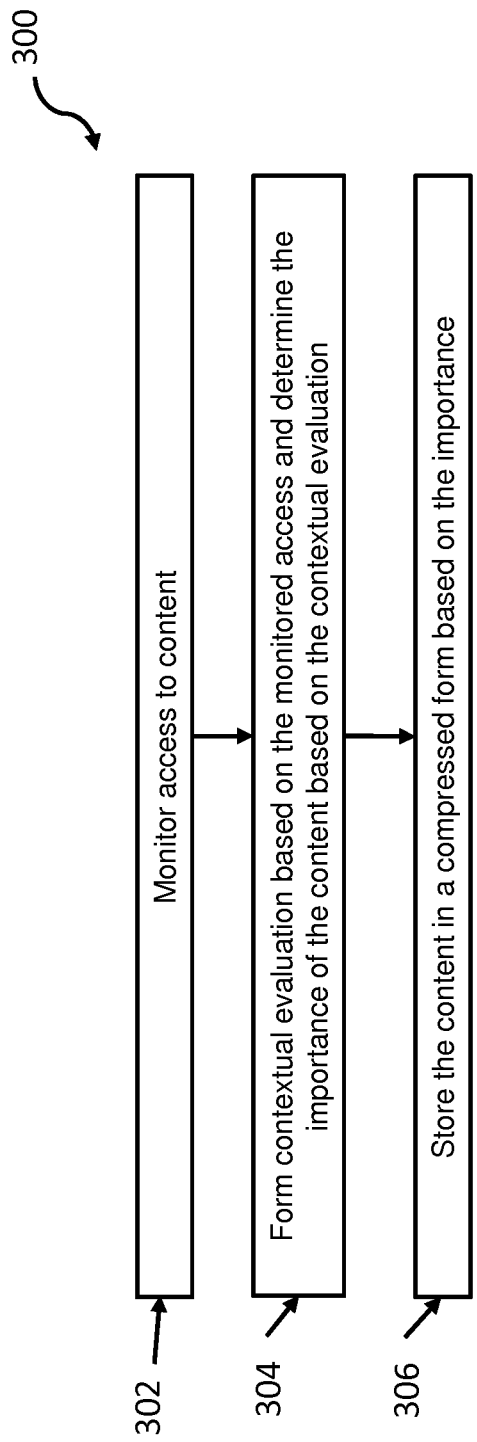
FIG. 3 depicts a flow diagram of a method for dynamic compression of multimedia content in accordance with an exemplary embodiment.

Referring now to FIG. 3, a flow diagram of a method 300 for dynamic compression of multimedia content is depicted, in accordance with an exemplary embodiment. By way of an overview, in some embodiments, content analysis engine 210 (hereafter "analysis engine 210") may analyze multimedia content 208 uploaded to and stored on media server 206 by leveraging, for example, social media analysis, environmental context analysis, and relationship analysis to determine an optimized compression level of a multimedia file.

In some aspects, analysis engine 210 may analyze the social, environmental and relational contexts, determine a relative importance score for each contextual analysis portion, and aggregate scores for the three areas of analysis based on a weighted scoring system. Analysis engine 210 may store the content in a compressed form based on the weighted score that may be indicative of a relative importance of the multimedia file.

In some embodiments, one or more users may upload multimedia content 208 to media server 206. In some respects, prior to analyzing the content, content analysis engine may assign a predetermined initial compression level to uploaded multimedia 208. For example, the predetermined initial compression level may be set to "high compression," to prevent unnecessary loss of information if analysis engine 210 determines that multimedia 208 has high importance.

Analysis engine 210 may compress one or more multimedia files 208 based on a relative importance of the media after analyzing the files. The importance may be based, at least in part, on the aggregated score. In some aspects, content analysis engine may monitor social, environmental, and relationship contexts with respect to each multimedia file stored on media server 206, and adjust the compression level of the multimedia based on material changes to the contexts.

Referring again to FIG. 3, as seen at block 302, analysis engine 210 may monitor access to multimedia content 208 uploaded to media server 206. Access to multimedia content 208 (described also as multimedia 208) may be indicative of a relative importance of the content with respect to multimedia viewership. Stated in another way, multimedia may be determined to be "important" if a predetermined number of viewers access the multimedia within a predetermined period of time.

As depicted in block 304, analysis engine 210 may form a contextual evaluation based on the monitored access, and determine an importance of the content based on the contextual evaluation. For example, if a digital multimedia file named "Origami Madness" receives 100,000 views on the first day, even prior to analyzing the media, analysis engine 210 may form a contextual evaluation based on the number of independent downloads, and determine that Origami Madness has a high relative importance. Analysis engine 210 may observe indicators of importance based on a variety of access factors, such as, for example, the number of views observed in a predetermined amount of time, the number of views in a predetermined amount of time with respect to the time that the multimedia was uploaded to media server 204, etc. A relative importance of a multimedia file may be represented by an aggregated score, which may be based on a plurality of contextual factors. Some contextual factors may carry a greater relative weight (score), depending on a desired multimedia storage goal. The aggregated score may be indicative of a determined importance of multimedia content.

FIG. 4 depicts a flow diagram of a method 400 for determining importance of content, in accordance with an exemplary embodiment. Referring now to FIG. 4, according to some embodiments, as depicted at block 402, analysis engine 210 may determine a social relevance and assign a social relevance score. In some aspects, analysis engine 210 may monitor social media trends to evaluate a particular context. For example, if social media indicators show that the video (e.g., multimedia 208) is currently trending, analysis engine 210 may assign a higher relative importance to multimedia 208.

Analysis engine 210 may also determine a history of how similar media has trended in the past. In some embodiments, analysis engine 210 may access an operatively stored computer memory, a database, a lookup table, etc., and determine whether one or more key words from the multimedia title have trended well in recent history (that is, during a predetermined period of time in the past). Analysis engine 210 may assign a multimedia context score to multimedia 208 based on the trend history or current trend analysis.

In other embodiments, analysis engine 210 may determine whether multimedia 208 features one or more individuals that have trended well in the past. Trending well may include a determination that a particular subject matter has increased in viewership at a predetermined rate with respect to some period of time. Accordingly, analysis engine may parse multimedia file 208, perform one or more facial recognition algorithms on the multimedia subjects, identify at least one individual, where the individual is known and has trended well in the past. In other embodiments, analysis engine 210 may determine an identity of one or more individuals based on metadata associated with multimedia 208. Accordingly, analysis engine 210 may assign a score to the video based on the identification of the individual, based on the individual's current or historic trend in social media.

In some aspects, analysis engine 210 may identify one or more individuals associated with multimedia file 208 (e.g., an individual that uploaded multimedia 208, an individual associated with the multimedia account, etc.), access at least one social media site associated with the identified individual, and determine, based on a number of social media contacts of the individual, a social media context score indicative of a high relative importance.

According to other embodiments, as depicted at block 404, analysis engine 210 may analyze an environmental context and form an environmental context score based on environmental context. For example, analysis engine 210 may determine whether a location identified in multimedia 208 is popular in similar videos (e.g., a concert venue, a sporting event venue, a sporting team, a landmark, etc.).

In one aspect, analysis engine 210 may form an evaluation of environmental context by determining whether a meteorological event in the area (e.g., a proximate geographic area to the geographic area in which multimedia 208 was recorded) at the time of the recording is of particular public interest. In some aspects, analysis engine 210 may determine, based on GPS data associated with multimedia 208, and further based on meteorological information derived from one or more online meteorological information providers, that a tornado in the geographic area associated with multimedia 208 has caused damage.

In other aspects, analysis engine 210 may determine an environmental relevance based on whether other users are recording the same or a similar event. In some embodiments, analysis engine 210 may determine what other users may be recording at the same time based on one or more videos automatically uploaded to media server 204 at a time proximate to when multimedia 208 was recorded. Accordingly, analysis engine 210 may determine that multimedia 208 may have a high relative interest to other multimedia consumers. In some aspects, analysis engine 210 may assign an appropriate context score to the environmental context portion of the analysis.

In other embodiments, analysis engine 210 may associate an environmental context score based on other environmental factors including whether multimedia 208 is indicative of social unrest (based on analysis of the subject matter of multimedia 208), or whether there other notable events have occurred having a temporal and/or geographic relationship to multimedia 208. Accordingly, analysis engine 210 may assign a higher geographic context score to current events that may normally have high public interest to multimedia consumers.

As depicted in block 406, analysis engine 210 may also consider a relationship context with respect to the recording relationship of the user posting multimedia 208. For example, if a subject in the video is a family member or an identifiable friend on the user's social media accounts, then analysis engine 210 may assign a higher relational score.

In some embodiments, as shown at block 408, analysis engine 210 may determine a first online posting relevance of multimedia 208 and assign a posting relevance score. For example, if multimedia 208 is posted in a private zone of media server 204 (e.g., having limited accessibility by a limited set of users), then a predetermined score may be assigned to the file. In other aspects, if multimedia 208 is posted in a public zone, an online posting relevance score may be assigned reflecting a different importance than that of a private posting.

According to some embodiments, analysis engine 210 may evaluate an aggregated relevance score, as shown at block 412. The aggregated relevance score may provide information for determining an optimized compression level.

Referring again to FIG. 3, after forming a contextual evaluation based on the monitored access, as discussed with respect to block 304, as shown in block 306, analysis engine 210 may store multimedia 208 in a compressed form based on the aggregated relevance score. For example, a lower score may trigger a high compression storage (having lower relative resolution), and a higher score may trigger a low compression storage (having a higher relative resolution).

According to some embodiments, analysis engine 210 may determine the importance by comparing the aggregated score to a predetermined threshold. In some aspects, analysis engine 210 may determine the compression level based on a relative relationship with the predetermined threshold.

In some aspects, analysis engine 210 may continue to re-analyze contextual scores as explained with respect to block 304. Accordingly, analysis engine 210 may continually reevaluate the contextual relevance of stored videos, and adjust high resolutions videos accordingly. For example, analysis engine 210 may adjust multimedia that has become less relevant based on an updated (current) relevance as indicated by the reconfigured scores.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for compressing content comprising:
    monitoring access to the content, wherein the content is captured by a first user;
    forming, by a processor, a contextual evaluation based on the monitored access and determining a level of importance of the content based on the contextual evaluation;
    storing the content in a compressed form based on a selected compression level, wherein the compression level is selected based on the level of importance;
    wherein the contextual evaluation for determining the level of importance of the content comprises:
        a social media trend measuring popularity of the content on one or more social media websites;
        a location factor indicative of a online location of a first social media sharing of the content, wherein the online location is at least one of a private zone or a public zone; and
        an environmental factor, wherein the environmental factor comprises:
            a geographic location of the first user based on Global Positioning System (GPS) data at a time when the first user captured the content, wherein the content is a first content;
            a geographic location of a second user with respect to the first user based on GPS data at a time when the second user captured second content; and
            meteorological information associated with a meteorological event, wherein the compression level for compressing the first content is selected based, at least in part, on whether the meteorological event is recorded in both the first content captured by the first user at the geographic location of the first user and in the second content captured by the second user at the geographic location of the second user with respect to the first user.

2. The computer-implemented method of claim 1, wherein the contextual evaluation further comprises evaluating a relationship with at least one individual in the content.

3. The computer-implemented method of claim 1, wherein the content is stored in a location that is determined based on the selected compression level of the compressed form.

4. The computer-implemented method of claim 1, wherein the content is a video.

5. The computer-implemented method of claim 4, wherein forming the contextual evaluation comprises identifying an identity of a subject of the video via facial recognition.

6. The computer-implemented method of claim 1, wherein forming the contextual evaluation comprises determining if a subject matter of the content is likely to be accessed at least a predetermined number of times within a predetermined period of time.

7. A system for compressing content comprising:
    a processor configured to:
        monitor access to the content, wherein the content is captured by a first user;
        form a contextual evaluation based on the monitored access and determine a level of importance of the content based on the contextual evaluation; and
        store the content in a compressed form based on a selected compression level, wherein the compression level is selected based on the level of importance;

wherein the contextual evaluation for determining the level of importance of the content comprises:
- a social media trend measuring popularity of the content on one or more social media websites;
- a location factor indicative of a online location of a first social media sharing of the content, wherein the online location is at least one of a private zone or a public zone; and
- an environmental factor, wherein the environmental factor comprises:
  - a geographic location of the first user based on Global Positioning System (GPS) data at a time when the first user captured the content, wherein the content is a first content;
  - a geographic location of a second user with respect to the first user based on GPS data at a time when the second user captured second content; and
  - meteorological information associated with a meteorological event, wherein the compression level for compressing the first content is selected based, at least in part, on whether the meteorological event is recorded in both the first content captured by the first user at the geographic location of the first user and in the second content captured by the second user at the geographic location of the second user with respect to the first user.

8. The system of claim 7, wherein the contextual evaluation further comprises the processor being configured to evaluate a relationship with at least one individual in the content.

9. The system of claim 7, wherein the processor is configured to store stored the content is stored in a location that is based on the selected compression level of the compressed form.

10. The system of claim 7, wherein the content is a video.

11. The system of claim 10, wherein forming the contextual evaluation comprises identifying an identity of a subject of the video via facial recognition.

12. The system of claim 7, wherein the processor is configured to determine if a subject matter of the content is likely to be accessed at least a predetermined number of times within a predetermined period of time, wherein the processor forms the contextual evaluation based on the determination.

13. A non-transitory computer-readable storage medium storing computer-executable instructions that, when executed, perform a method comprising:
monitoring access to the content, wherein the content is captured by a first user;
forming, by a processor, a contextual evaluation based on the monitored access and determining a level of importance of the content based on the contextual evaluation; and
storing the content in a compressed form based on a selected compression level, wherein the compression level is selected based on the level of importance;
wherein the contextual evaluation for determining the level of importance of the content comprises:
- a social media trend measuring popularity of the content on one or more social media websites;
- a location factor indicative of a online location of a first social media sharing of the content, wherein the online location is at least one of a private zone or a public zone; and
- an environmental factor, wherein the environmental factor comprises:
  - a geographic location of the first user based on Global Positioning System (GPS) data at a time when the first user captured the content, wherein the content is a first content;
  - a geographic location of a second user with respect to the first user based on GPS data at a time when the second user captured second content; and
  - meteorological information associated with a meteorological event, wherein the compression level for compressing the first content is selected based, at least in part, on whether the meteorological event is recorded in both the first content captured by the first user at the geographic location of the first user and in the second content captured by the second user at the geographic location of the second user with respect to the first user.

14. The non-transitory computer-readable storage medium claim 13, wherein the contextual evaluation further comprises evaluating a relationship with at least one individual in the content.

15. The non-transitory computer-readable storage medium claim 13, wherein the content is stored in a location that is determined based on the selected compression level of the compressed form.

16. The non-transitory computer-readable storage medium of claim 15, wherein:
the content has a first portion and a second portion, and a determined level of importance of the first portion differs from a determined level of importance of the second portion;
the first and second portions include one or more of a content element, a content segment, and a content page; and
the content is stored in a first compressed form at a first location different from a second compressed form at a second location.

* * * * *